D. BROWN.
COMPARTMENT CONTAINER.
APPLICATION FILED JAN. 29, 1918.
1,312,472. Patented Aug. 5, 1919.
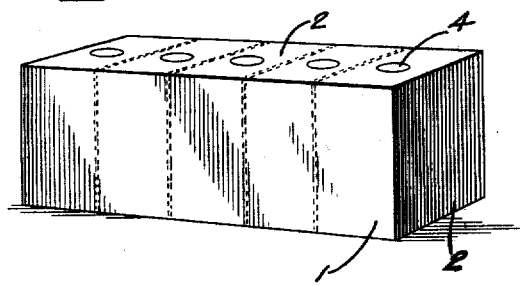
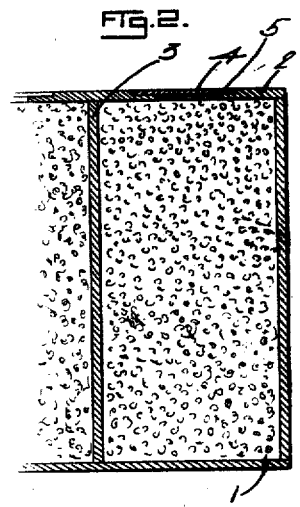
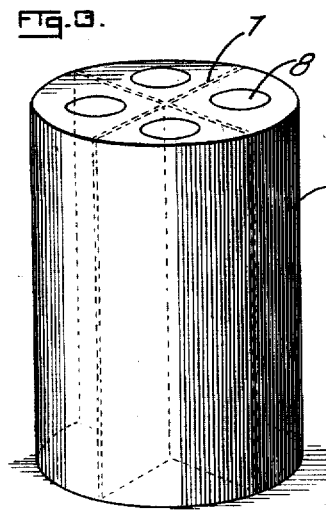
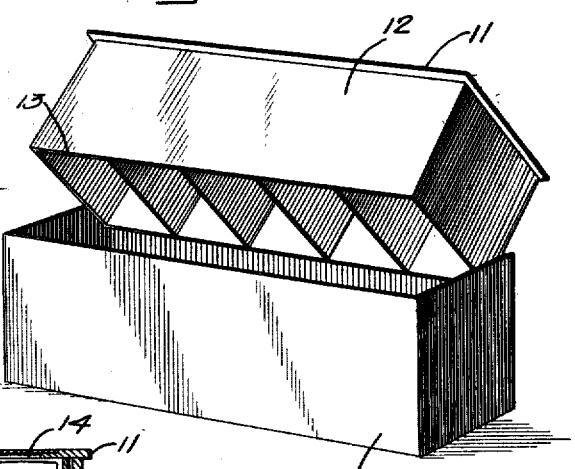
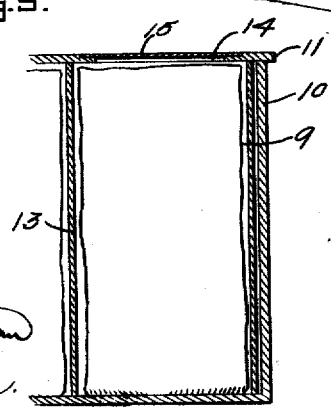
WITNESSES
INVENTOR
David Brown
BY
ATTORNEYS

UNITED STATES PATENT OFFICE.

DAVID BROWN, OF NEW YORK, N. Y.

COMPARTMENT-CONTAINER.

1,312,472.　　　　Specification of Letters Patent.　　Patented Aug. 5, 1919.

Application filed January 29, 1918. Serial No. 214,314.

*To all whom it may concern:*

Be it known that I, DAVID BROWN, a citizen of the United States, and a resident of the city of New York, borough of Bronx, in the county of Bronx and State of New York, have invented a new and Improved Compartment-Container, of which the following is a full, clear, and exact description.

This invention relates to containers for coffee, tea, cocoa, and other material where it is desired to keep the contents in their original condition, and has for an object the provision of an improved structure wherein segregated quantities may be maintained in their original condition in a sealed container.

Another object in view is to provide a container having a plurality of independent compartments and a normally sealed opening for each compartment whereby the contents of the respective compartments may be removed individually.

A further object of the invention is to provide a container, a plurality of compartments open at one end, and a casing for receiving the compartments so that the bottom of the casing will act as the bottom of the open end compartments.

A still further object of the invention is to provide a container with a plurality of independent compartments each having an independent normally sealed opening, and a wrapping over the entire container whereby a single article of commerce is produced which presents individual or separated sections positioned so as to allow the use of the material in one section while protecting the sealed matter in the next adjacent section.

In the accompanying drawing:

Figure 1 is a perspective view of a compartment container disclosing an embodiment of the invention.

Fig. 2 is an enlarged fragmentary sectional view through Fig. 1 on approximately line 2—2.

Fig. 3 is a perspective view of a slightly modified form of container to that shown in Fig. 1.

Fig. 4 is a perspective view of a further modified container to that shown in Fig. 1, the parts being slightly separated for better illustrating the structure.

Fig. 5 is a view similar to Fig. 2, but showing a form of the invention disclosed in Fig. 4.

Referring to the accompanying drawing by numerals, 1 indicates a container which may be made of any material, as for instance cardboard. The container 1 is provided with a cover 2 of cardboard or other suitable material, and one or more partitions 3 whereby there will be two or more compartments in the casing 1. The intention is to pack either ground coffee or coffee in the bean, cocoa, tea or other articles of food in the container and to seal the same against the action of the air and other elements so that the contents will remain in its normal condition, and the coffee for instance will retain its aroma. If desired the casing 1 and the cover could be dipped in paraffin, though ordinarily this is not necessary. The top 2 is provided with an aperture 4 for each of the compartments, said aperture being normally closed by a covering member 5 formed of paper, metal or other desired material and secured in place by an adhesive or other means as preferred. Five compartments have been shown in Fig. 1, but it will be evident that a greater or less number could be provided as a complete unit. In forming the casing with partitions as above described separate compartments are provided so that the consumer uses the coffee or other material in one compartment while the remaining compartments remain sealed and consequently remain in their original condition. A second compartment may be used and so on until the entire set of compartments have been emptied.

In Fig. 3 will be seen a slightly modified form of the invention wherein a container 6 is made round instead of rectangular as shown in Fig. 1. A plurality of partitions are arranged in the casing 6 there being four shown, but it will be evident that a larger or smaller number could be provided. An aperture 7 is provided for each compartment, said apertures being normally closed by respective covering members 8 constructed and arranged as shown in Fig. 2.

In some instances it is desired to pack the coffee or other articles in a bag or other package 9 as shown in Fig. 5. When this is desirable the casing 10, as shown particularly in Fig. 4, is provided with end and side walls and a bottom, while the covering member 11 is provided having side and end walls 12 together with a number of partitions 13 forming independent compartments when the side and end walls 12 are arranged in the casing 10 as disclosed in Fig. 5. Preferably a covering member 11 is provided with a comparatively large opening 14 for each of the compartments formed by the side and end walls 12 and the partitions 13. A cover 15 of metal, paper, wood or other material is provided as in the form shown in Fig. 2. It is evident that the aperture 14 could be made large as shown or small, as well as the aperture 4 could be made large or small, without departing from the spirit of the invention. The intention is to provide a number of bags or packages 9 which are placed individually in the respective compartments formed by the partitions 13 and associate parts and then the casing 10 telescoped thereover. These parts may be formed of pasteboard, wood or other material and may be dipped in paraffin if desired, though ordinarily this is not necessary. After the parts have been telescoped together as shown in Fig. 5, or arranged as shown in Figs. 1, 2 and 3, a piece of wrapping paper placed around the entire casing and then tied with cord or other suitable means makes a complete single package. This package always remains in the same condition and is not opened until after it has been delivered to a consumer who removes the wrapping and then opens the respective compartments successively as the contents may be needed. In this way the merchant may sell several pounds of coffee, or other articles at one time, and the consumer will be assured that the contents is full weight and at the same time in their original wholesome condition.

What I claim is:

1. A compartment container comprising a casing having side walls, end walls and a bottom, a covering member therefor, a pair of side and a pair of end walls connected with the covering member and depending therefrom, a plurality of partitions connected with said covering member arranged between said last mentioned side walls, said last mentioned side walls and said partitions telescopingly fitting into the container formed by the first mentioned side and end walls and bottom, said covering member having an aperture for each of the compartments, and a covering plate for each of said apertures.

2. A compartment container for coffee and the like comprising a substantially airtight casing having sides, ends, a bottom and a top, a plurality of partitions extending from one side to the other and connected to and depending from the top for dividing the casing into sections, said top having an aperture therein for each of said sections, and a substantially airtight closure for each of said apertures, each of said closures being independently removable so that the contents of one section may be removed without molesting the contents of any of the other sections.

DAVID BROWN.

Copies of this patent may be obtained for five cents each, by addressing the "Commissioner of Patents, Washington, D. C."